UNITED STATES PATENT OFFICE.

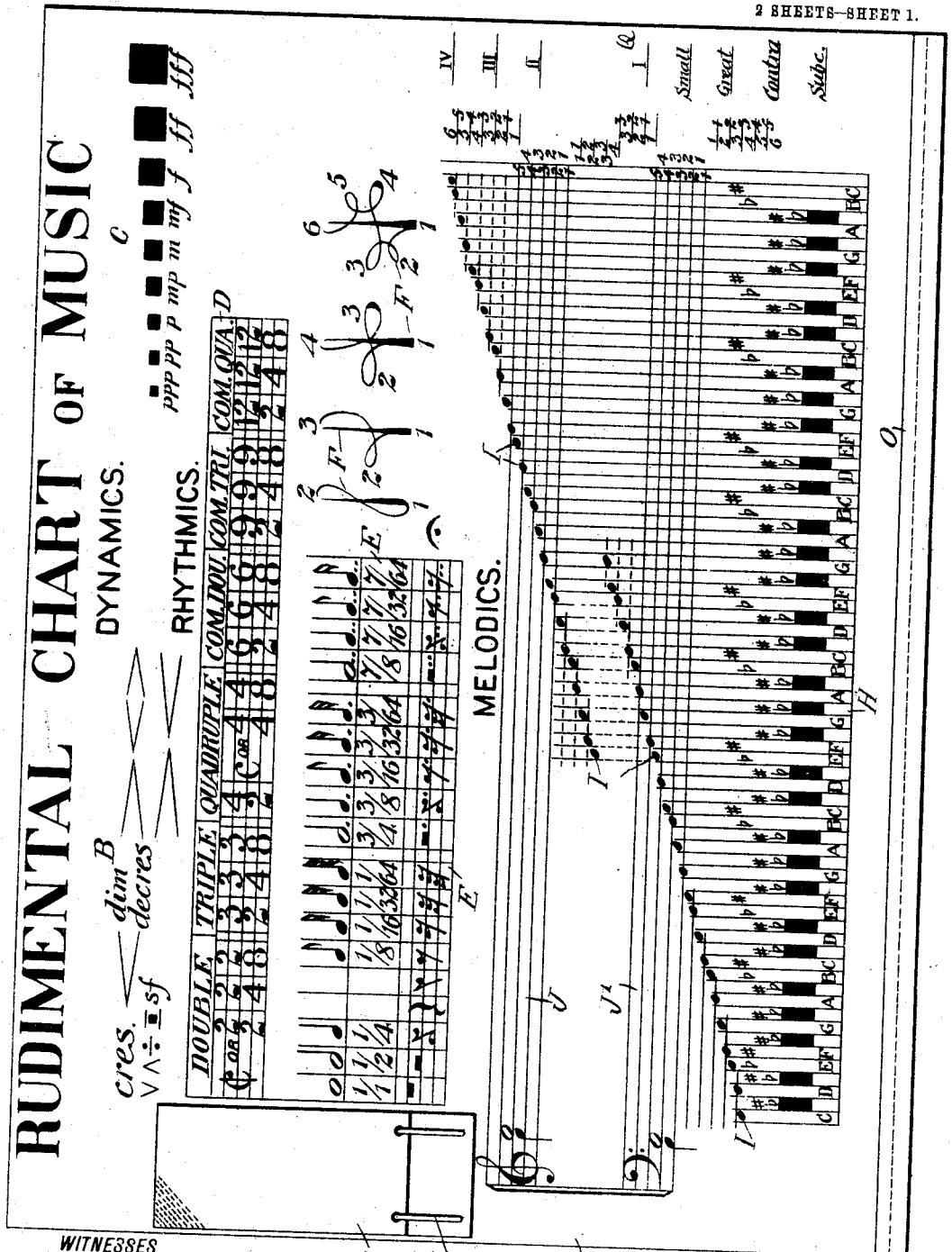

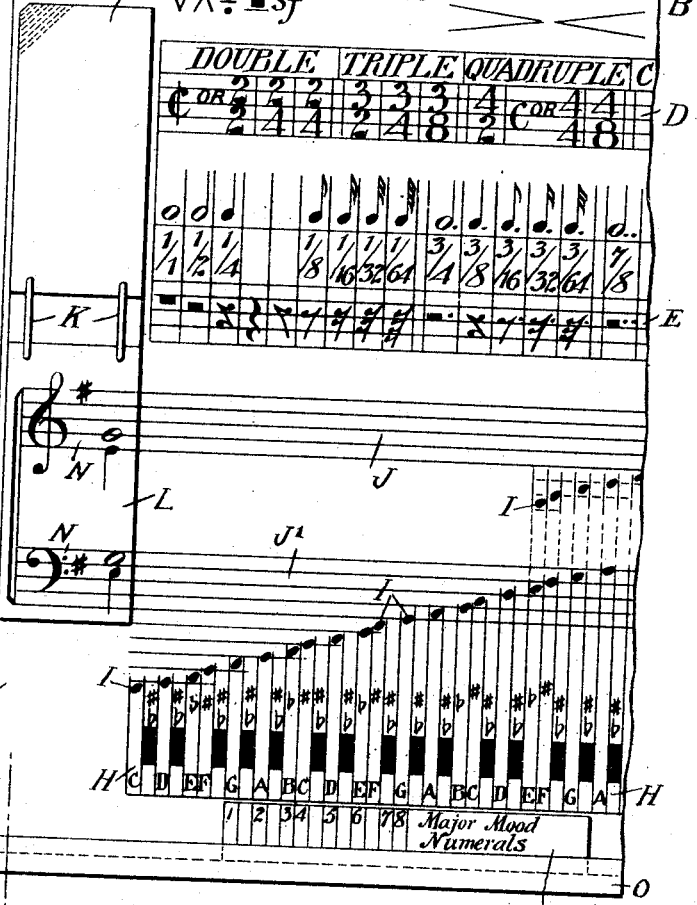

OTTO NELSON, OF AXTELL, NEBRASKA.

MUSIC-TEACHING DEVICE.

979,193. Specification of Letters Patent. Patented Dec. 20, 1910.

Application filed June 8, 1909. Serial No. 500,938.

*To all whom it may concern:*

Be it known that I, OTTO NELSON, a citizen of the United States, and a resident of Axtell, in the county of Kearney and State of Nebraska, have invented a new and Improved Music-Teaching Device, of which the following is a full, clear, and exact description.

The invention relates to educational appliances, and its object is to provide a new and improved music teaching device, more especially designed for teaching the rudiments of music, particularly transposition, by the use of slides bearing characters denoting the intervals of the gamut or diatonic scale, the slides being movable relative to the representation of a key board, the keys of which are alined with the corresponding notes on a staff, and movable signature cards bearing the signatures of the different keys which are adapted to be placed in alinement with the staff lines of the said staff.

A practical embodiment of the invention is represented in the accompanying drawings forming a part of this specification, in which similar characters of reference indicate corresponding parts in all the views.

Figure 1 is a face view of the improvement; Fig. 2 is a like view of part of the same and showing one of the signature cards displayed, and the transposing slide with the gamut characters for the major key in corresponding position; Fig. 3 is a cross section of the same on the line 3—3 of Fig. 2; Fig. 4 is a reverse face view of the slide bearing the major key gamut characters; Fig. 5 is a face view of the slide bearing the gamut characters for the minor keys; and Fig. 6 is a reverse face view of the same.

The music teaching device is mounted on a music chart A of suitable size and material, and the chart is provided on its face with representations relating to dynamics, rhythmics and melodics.

The dynamic representation, as plainly shown in Fig. 1, contains the signs and abbreviations B used for expressing the volume of the tones, and a diagrammatic representation C represents the force of the tones. The diagrammatic representation C consists of geometrical figures, preferably square, but increasing in size from $p, p, p$ to $f, f, f$, thus giving a graphical illustration of the force of the tone.

The rhythmic representation contains the different times D, their names and as they are written on the staff lines, the various notes and rests and their values E and the graphical representation of the beats F. The different times D are arranged in progressive order and in sets headed by the proper names. The different notes are arranged in regular order in a longitudinal row, above a row indicating the corresponding time value of the notes, and below this row giving time value are arranged in regular order the different rests, corresponding to the time value given in the row above. Each of the several beats F is represented by numerals, and a line graphically illustrating the path of a baton, the line having a straight down stroke portion, increasing gradually in thickness for emphasis, and the return or upward stroke portion being curved and passing to opposite sides of the down stroke portion, the numerals being placed on the corresponding returning points of the beat line. The up stroke portions in the four and six beats are thickened at the numerals 3 and 4 to emphasize the beat.

Under the heading melodics is represented a key board of a desired number of octaves, and having the names of the keys H appearing on the corresponding keys, the latter being in alinement with corresponding notes I of the treble and bass scales, the notes being arranged on, above and below the staff lines J, J' for the treble and bass. The staff lines J, J' extend longitudinally at right angles to the keys H, as plainly shown in the drawings. A holder K is arranged on the chart A at the left side thereof, directly above the left end of the staff lines J, J', and on the said holder K are mounted to turn up or down signature cards L bearing the different signatures of the keys N in which the music is written, it being understood that each card contains a single signature. Each card L, as shown in Fig. 2, is provided with staff lines adapted to register with the staff lines J, J' and with the key note for the major and minor keys, the whole note indicating the major and the quarter note the minor. The holder K is preferably in the form of parallel staples, secured at their ends to the chart A, and the cards L are provided with apertures through which pass the staples, so that the cards L can be swung up or down on the holder K. When the cards are swung up, as shown in Fig. 1, they are in non-displaying position, but when swung down the staff lines of the key N register with the staff lines J, J' (see Fig. 2), so that the scale notes of the card L displayed at the time can be readily traced along the staff lines J, J' and to the corresponding key H of the key board. Along the bottom of the chart A is arranged a longitudinal guideway O for slides P, P' bearing characters denoting the intervals of the gamut or diatonic scale, the slide P being for the major mood and the slide P' for the minor mood, the said slides having vertical divisions corresponding to the keys H of the key board, as will be readily understood by reference to Fig. 2. The divisions or graduations of the slides P, P' bear on one face the numerals from 1 to 8 (see Figs. 2 and 5), and on the other face the syllables according to the sol-fa system, as shown in Figs. 4 and 6.

By the arrangement described, a transposing device is had, used as follows: When the signature cards L are all turned up, as shown in Fig. 1, and the slide P is placed in position on the guideway O, with the numeral 1 (do) in register with the lowest C on the left-hand side of the key board, then the numeral 2 (re) is under the key D, the numeral 3 (mi) is under the key E, the numeral 4 (fa) is under the key F, the numeral 5 (sol) is under the key G, the numeral 6 (la) is under the key A, the numeral 7 (ti) is under the key B and the numeral 8 (do) is under the key C of the next octave. Now in transposing ascendingly, to obtain all the keys with sharp signatures, the operator moves the slide P along the guideway O in the direction from the left to the right correspondingly, say to the position shown in Fig. 2, so that the numeral 1 (do) is in register with the key G, and then the operator swings down the first signature card L, thus showing how the first sharp is to be written, it being understood that the first card turned down indicates the key of G major. In the position of the slide P shown in Fig. 2, the numeral 5 is in alinement with the key D, and when the slide P is now shifted to the right until the numeral 1 is under this key D, it is found that the key C must be sharped as it is in register with the division having no numeral, and consequently the key of D major is disclosed, and when the next following card is turned down it shows in what position the sharp is to be placed. The operator proceeds in a like manner to obtain all the different scales in which the music is written, it being understood that not only the positions for the sharps are found but also for the flats by 4th or sub-dominant, and the transposition of the minor keys is proceeded with in the same manner, with the only difference that the slide P' is used and that the key A is the tonic for the model scale. The names of the octaves for both treble and bass are indicated at Q at the right hand of the chart, as shown in Fig. 1.

From the foregoing it will be seen that by the use of this device, rudimentary music can be readily taught in a simple and comprehensive manner, thus rendering the device exceedingly useful for schools as well as for self teaching.

Having thus described my invention, I claim as new and desire to secure by Letters Patent:

1. In a music teaching device, a chart comprising the representation of a key board, a note scale and the staff lines, the notes of the note scale being alined with the corresponding keys of the said key board and the staff lines being at right angles to the length of each of said keys, a holder comprising parallel staples secured at their ends to the said chart, signature cards provided with apertures through which pass the said staples, so that the cards can be swung up or down on the holder to bring each signature card into alinement with the said note scale, and a slide movable relative to the said key board and bearing characters denoting the intervals of the gamut or diatonic scale.

2. In a music teaching device, a chart comprising the representation of a key board, a note scale and staff lines, the note scale being alined with the corresponding keys of the said key board, a holder secured to the chart and having upper and lower members, signature cards mounted at one end on the holder and adapted to be swung up or down on the respective members of the holder to move the cards either into non-displaying position or into displaying position and in alinement with the staff lines, a slide movable on the chart relative to the key board and bearing gamut characters, and representations on the said chart indicating the volume and force of the tones, the different times, the various notes and rests and their values, and the several beats.

3. In a music teaching device, a chart comprising the representation of a key board, and note scale, the notes of the note scale being alined with the corresponding keys of the said key board, a guideway at the lower part of the chart, a slide movable in said guideway relative to the key board and bearing characters denoting the intervals of the gamut, a holder comprising parallel staples secured to the said chart, and signature cards mounted on the staples and adapted to be swung upward on the upper limbs of the staples into non-displaying position, or swung downward on the lower limbs of the staples with the staff lines of the card in register with the staff lines of the note scale.

In testimony whereof I have signed my name to this specification in the presence of two subscribing witnesses.

OTTO NELSON.

Witnesses:
FRANK SWANSON,
IRVING F. MILLER.